United States Patent
Whelan et al.

(10) Patent No.: US 8,160,576 B2
(45) Date of Patent: Apr. 17, 2012

(54) LEO-BASED POSITIONING SYSTEM FOR INDOOR AND STAND-ALONE NAVIGATION

(75) Inventors: David A. Whelan, New Port Coast, CA (US); Clark E. Cohen, Washington, DC (US); Greg M. Gutt, Leesburg, VA (US); Barton G. Ferrell, Troy, IL (US)

(73) Assignee: The Boeing Company, Chicago, IL (US)

(*) Notice: Subject to any disclaimer, the term of this patent is extended or adjusted under 35 U.S.C. 154(b) by 301 days.

(21) Appl. No.: 12/367,027

(22) Filed: Feb. 6, 2009

(65) Prior Publication Data

US 2010/0220007 A1 Sep. 2, 2010

Related U.S. Application Data

(63) Continuation of application No. 10/879,256, filed on Jun. 29, 2004, now Pat. No. 7,489,926.

(60) Provisional application No. 60/536,823, filed on Jan. 15, 2004.

(51) Int. Cl.
*H04W 4/00* (2009.01)

(52) U.S. Cl. .................... 455/427; 455/456.1; 455/12.1; 455/456.6

(58) Field of Classification Search ................ 455/427, 455/456.1, 12.1, 456.6, 421, 429, 430, 431, 455/13.2, 456.3, 67.11; 342/357.06, 357.16, 342/357.12, 357.08, 357.02, 352, 359
See application file for complete search history.

(56) References Cited

U.S. PATENT DOCUMENTS

| | | | | |
|---|---|---|---|---|
| 6,049,304 | A * | 4/2000 | Rudel et al. | 342/357.34 |
| 6,373,432 | B1 * | 4/2002 | Rabinowitz et al. | 342/357.29 |
| 2003/0016172 | A1 * | 1/2003 | Natsume et al. | 342/359 |
| 2004/0210389 | A1 * | 10/2004 | Zimmerman et al. | 701/213 |

* cited by examiner

*Primary Examiner* — John J Lee

(57) ABSTRACT

A method for estimating a precise position of a user device from signals from a low earth orbit (LEO) satellite includes receiving at least one carrier signal at a user device, each carrier signal being transmitted a distinct LEO satellite. The user device processes the carrier signals to obtain a first carrier phase information. The user device recalls an inertial position fix derived at an inertial reference unit. The user device derives a position of the user device based on the inertial position fix and the first carrier phase information.

20 Claims, 5 Drawing Sheets

LEO-BASED POSITIONING SYSTEM FOR INDOOR AND STAND-ALONE NAVIGATION

RELATED APPLICATIONS

This application is a continuation of U.S. Ser. No. 10/879,256, which was filed on Jun. 29, 2004 now U.S. Pat. No. 7,489,926 and which claims priority from a provisional application Ser. No. 60/536,823 filed on Jan. 15, 2004 and entitled, "LEO-BASED POSITIONING SYSTEM FOR INDOOR AND STAND-ALONE NAVIGATION." The provisional application is incorporated by reference.

FIELD OF THE INVENTION

This invention relates generally to systems for navigation and, more specifically, to using LEO satellites for navigation.

BACKGROUND OF THE INVENTION

In many instances, GPS may not be available to a navigation user. In hostile conditions, GPS may be jammed or otherwise defeated. In indoor application, GPS has insufficient power to penetrate the walls of buildings.

GPS now provides at least four ranging sources simultaneously which enables instantaneous, three-dimensional positioning. However, GPS has a low-power signal that limits operations indoors or in conditions of heavy jamming. A fundamental advantage of the system described herein is that it simultaneously addresses the limitations of its predecessors, providing a dynamic, three-dimensional, accurate position fixes—even indoors or in the presence of jamming.

The Low Earth Orbiting (LEO) satellite constellations, such as Iridium, have been suggested as offering a precise user time standard allowing navigation without using GPS. Patents have been granted for using the time standard from the LEO satellites for augmenting the functionality of the GPS system include such patents as U.S. Pat. RE 37,256, issued to Cohen, et al. entitled, "System and Method For Generating Precise Position Determinations;" U.S. Pat. No. 5,812,961 issued to Enge, et al. entitled, "Method And Receiver Using A Low Earth Orbiting Satellite Signal To Augment The Global Positioning System;" U.S. Pat. No. 5,944,770 issued to Enge, et al. entitled, "Method And Receiver Using A Low Earth Orbiting Satellite Signal To Augment The Global Positioning System;" and U.S. Pat. No. 6,373,432 issued to Rabinowitz, et al. entitled "System Using LEO Satellites For Centimeter-Level Navigation. These patents still rely, in large part, upon the GPS system.

The performance of MEMS technology is evolving rapidly and can often be optimized for various applications. MEMS technology has been applied to tuning forks in order to produce accelerometer that resolve acceleration to an extent to allow some navigational use. Inertial-grade mechanical inertial units can also provide a means for inertial navigation. In some applications alternating between GPS navigation and inertial navigation has been used for navigation where GPS access is intermittent. Such systems rely upon the presence of GPS to initially fix a position for subsequent inertial navigation.

What is needed is a low-cost, accessible means for precise navigation that operates independently of GPS.

SUMMARY OF THE INVENTION

The present invention comprises a system for leveraging the relative strengths of at least two navigation systems, an inertial navigation system and a LEO satellite navigation system. The inertial navigation system is used to ameliorate the integration load on the LEO satellite navigation processing system and the inertial system provides a good approximation of the changing position of the user device where jamming or an indoor environment blocks the use of the LEO satellite navigation. In turn, the LEO satellite navigation system will provide a precise position location to refine the inertial position fix wherever a precise position is available.

The presently preferred embodiment includes the ability to further fix a position with an signal input from a ground-based reference station. The ground-based reference station is advantageously positioned to receive signals from the LEO satellite through a portion of the earth atmosphere that is similar in propagation properties to the portion of earth atmosphere through which the signal received at the user device has passed to reach the user device.

In accordance with still further aspects of the invention, a position derived by a GPS positioning system can be used to refine the positional fix used for both the LEO-based satellite navigation system and the inertial positioning system. Additionally, a positioning of the user device at a precisely known position will appropriately refine the inertial position fix as well as the LEO satellite-derived position.

In accordance with yet another aspect of the invention, the advantageously rapid changing geometry of the LEO satellites allows rapid convergence of a positional fix.

In accordance with preferred embodiments of the present invention, a Low Earth Orbiting (LEO) satellite constellation, such as Iridium, is used as a ranging source operating in conjunction with MEMS inertial sensors and a precise user time standard to offer an effective and low-cost approach to navigation without using GPS. Applications of the present invention include (but are not limited to) ultra-wide-band interference protection, anti jam protection, and enhanced ability to use GPS indoors.

In accordance with further aspects of the invention, MEMS inertial sensors are used to further compact a form factor for the user-device.

In accordance with still further aspects of the invention, inertial navigation sensors significantly reduce integration time on a signal transmitting over a special Iridium broadcast channel that has no data modulation (or with schemes that emulate low modulation rates). The inertial navigation sensor removes much of the effective bound-on integration time. Integration times of several seconds would allow an extremely weak Iridium signal (that had originally been boosted 30 to 45 dB above GPS in power) to be used deep indoors or in conditions of high jamming.

In accordance with other aspects of the invention, the inventive method and apparatus reduces multipath. Treating the superposition of several sub-bands as a CDMA signal rather than a TDMA signal allows the superposition to be processed by code correlators inside an Iridium receiver to estimate multipath in real time.

In accordance with other aspects of the invention, the inventive method and apparatus combines its results with those of such other satellite navigation systems as may be available or intermittently available to establish fixes to augment positioning solutions. The more ranging sources, the better. Examples of other useable satellites are Globalstar and GPS. In general, with more ranging sources, biases can be estimated more quickly, and the dependence on the inertial component can be loosened in proportion to the additional ranging data available.

In accordance with still another aspect of the invention, the inventive method and apparatus operate as a backup to GPS in case of jamming. If the user has a clear view of the sky as in JPALS applications, this system could provide high-accuracy and integrity positioning on a stand-alone basis during times when GPS is not available.

As will be readily appreciated from the foregoing summary, the invention provides a method for estimating a precise position of a user device from signals from a low earth orbit (LEO) satellite and includes receiving at least one carrier signal at a user device, each carrier signal being transmitted a distinct LEO satellite. The user device processes the carrier signals to obtain a first carrier phase information. The user device recalls an inertial position fix derived at an inertial reference unit. The user device derives a position of the user device based on the inertial position fix and the first carrier phase information.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to satellite navigation. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

By way of overview, a method for estimating a precise position of a user device from signals from a low earth orbit (LEO) satellite includes receiving at least one carrier signal at a user device, each carrier signal being transmitted a distinct LEO satellite. The user device processes the carrier signals to obtain a first carrier phase information. The user device recalls an inertial position fix derived at an inertial reference unit. The user device derives a position of the user device based on the inertial position fix and the first carrier phase information.

Figure 1:
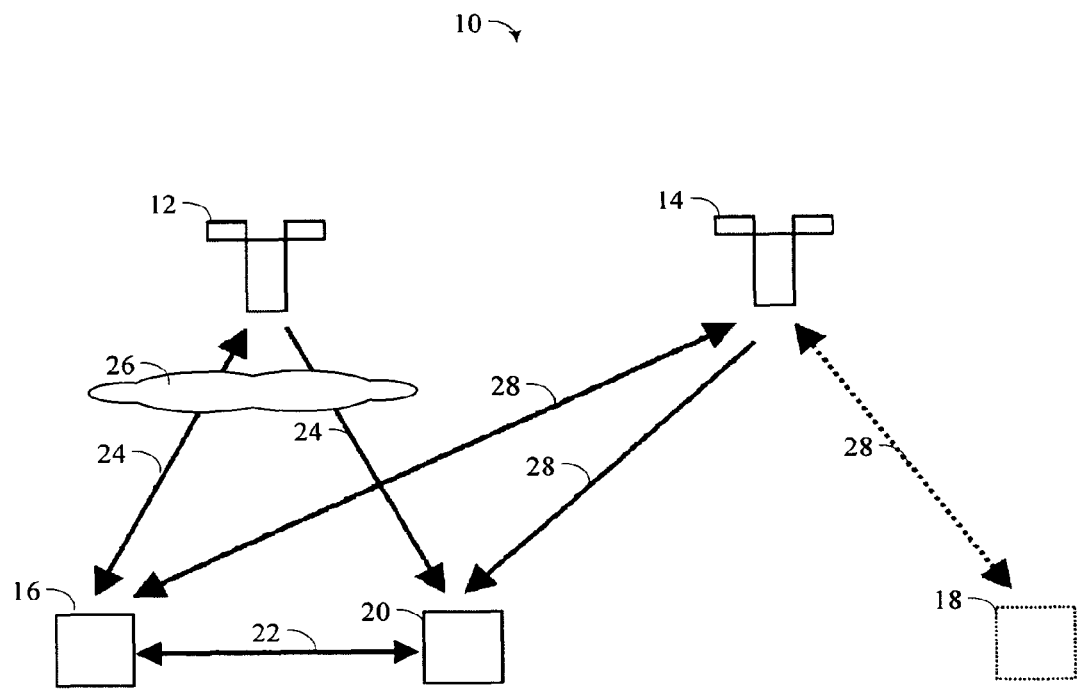
FIG. 1 is a block diagram of an indoor positioning system using LEO satellites.

FIG. 1 illustrates a preferred system in which Iridium (or other LEO) satellites 12, 14 are used to provide ranging systems to a user in conjunction with one or more reference stations 16, 18. One of the advantages of using Iridium is that it is able to produce a signal that is much stronger than that produced by GPS satellites. Depending on circumstances, the Iridium satellite can be configured to provide users with approximately 20 dB to 40 dB or more received power than GPS.

Positioning using a single ranging source in a three-dimensional dynamic environment with Iridium differs significantly from previous positioning systems in that single ranging sources have been limited to two-dimensional resolution on an idealized surface. With the Navy Navigation Satellite System known as TRANSIT, for example, the user was only able to make quasi-static, two-dimensional measurements that were limited in accuracy. Normally, a minimum of four operational TRANSIT satellites were needed to provide the required frequency of precise navigation fixes.

GPS now provides at least four ranging sources simultaneously in order to enable instantaneous, three-dimensional positioning. However, GPS has a low-power signal that limits operations indoors or in conditions of heavy jamming. A fundamental advantage of the inventive system is that it simultaneously addresses the limitations of its predecessors, providing a dynamic, three-dimensional, accurate position fixes—even indoors or in the presence of jamming. Augmented positioning using Iridium should be able to achieve suitable performance limited principally by the effects of ambient multipath.

A ground support infrastructure is present to provide differential reference measurements. In the presently preferred embodiment, a reference station 16 receives signals from satellites 12 and 14 using reference equipment. Such reference equipment can be functionally identical to a user equipment 20 differing only in that the local position of a receiving antenna is precisely know by survey or other conventional means including GPS positioning.

Differential reference measurement involves the cooperation of at least two receivers, the reference station 16, and the user equipment 20. The cooperation of the at least two receivers, relies upon a signal 24 received at both the reference station 16 and the user equipment 20 are degraded by virtually the same errors. The cooperation is possible on earth when the signals pass through virtually the same slice of atmosphere containing the same obstructions to signals 26. To occur on the surface of the earth, the user equipment 20 and the reference station 16, generally, can be separated by fewer than approximately a thousand kilometers. Where such geometry is present, the signal 24 that reach both of the user equipment 20 and the reference station 16 will have traveled through the same obstacles 26 or will be augmented by the same pattern of jamming.

The reference station 16 provides real-time measurements of the Iridium clock. A data message 22, which, in the presently preferred embodiment, is transmitted over Iridium from the reference station 16 to the user receiver 20, provides a real-time range correction to each measurement to account for both Iridium clock errors and atmospheric effects including obstacles 26 or jamming. Since the reference station 16 has no way of knowing which of the many available satellites the user receiver 20 might be using to calculate its position, the reference receiver 16 quickly runs through all the visible satellites, such as satellite 14, and then computes the error attendant to its signal 28. The corrections necessary to bring the calculated result into line with the known local position of the reference station are then transmitted on any suitable band with adequate confidence in the jamming environment to the user equipment in association with time references to establish near real time correction. In general, navigation performance degrades as separation between user and reference station gets greater due to attendant differences in obstacles 26 or jamming the signal 24 experiences.

Where a second reference station 18 is suitably close, the second reference station 18 can perform the same calculations on the signal 28 as the first reference station 16 yielding a second correction factor from, for instance, the satellite 14, allowing the user equipment to achieve greater precision by averaging or other suitable means of harmonizing the error calculation.

Figure 2:
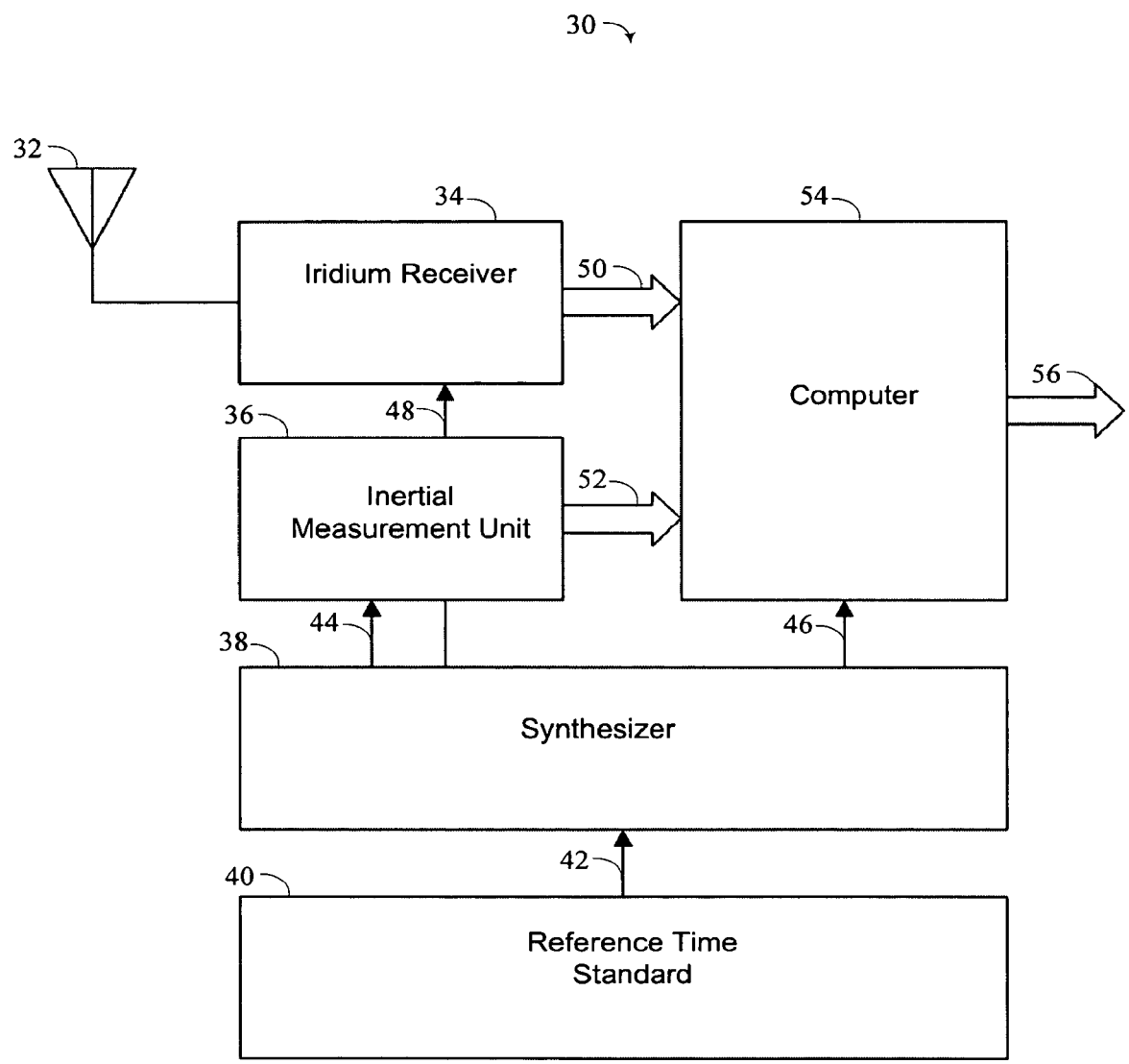
FIG. 2 is a diagram of a differential positioning system using LEO satellites.

Referring to FIG. 2, a block diagram for presently preferred system architecture for a positioning system 30 uses Iridium or other LEO satellites. Each component of the positioning system 30 is driven from the same master clock—a precise time standard 40. A synthesizer 38 creates each of the requisite coherent sine wave and clock signals for each component based upon a clock signal fed to the synthesizer 38 from the precise time standard 40 through a data bus 42.

An antenna 32 is configured to receive transmissions from the Iridium or other LEO satellites as the presently preferred embodiment is configured and is optimized for L band reception. An Iridium receiver 34 receives a raw signal received at the antenna 32 and compares it with the signal generated by the synthesizer 38 and presented to the receiver 34 at a data bus 48. By comparing the signal at the data bus 48 with the transmission received at the antenna 32, the Iridium receiver 34 presents data sufficient to compute a position solution.

An augmented position solution is calculated using an inertial measurement unit 36 receiving a clock signal from the synthesizer 38. Measuring acceleration with the inertial measurement unit 36 in the presently preferred embodiment is accomplished by accelerometers oriented in three orthogonal axes and measuring angular rate about each such axis to compute attitude accurately relative to a vertical axis accomplish accurate attitude sensing. Attitude and other parameters or orientation and motion of the user are derived from the data produced by the accelerometers and rate sensors within the common assembly. In the presently preferred embodiment, the accelerometers are MEMS inertial sensors.

Measuring acceleration with the inertial measurement unit 36 in the presently preferred embodiment augments the system to provide a system that anticipates the next position of the user. Optionally, the position solutions derived by use of the inertial measurement unit 36 may be harmonized with earlier solutions to gain a self-testing ability and to reduce a radius of error in the calculation of the position with the inertial measurement unit 36.

Three-dimensional positioning and filtering using Iridium operates over time scales of about 10 minutes—much less than the 84-minute Schuler period. The Schuler period is the period for a simple undamped pendulum with a length equivalent to the radius of the earth and has been used to correct traditional inertial navigation equipment for the curved movement of a spot on the surface of the earth. Therefore, the inertial unit needs to be capable of providing relative position measurements whose accuracy is significantly better than the filtered range measurement accuracy of the Iridium signal.

With MEMS inertial sensors of sufficient performance, degradation due to the ambient multipath of an indoor environment will dominate the overall system-level accuracy. The total system accuracy will start out in the 4-meter range representing one sigma in standard deviation. Advanced signal processing techniques applied to the Iridium signal significantly reduce indoor multipath error. In outdoor applications with an unobstructed view of the sky, the accuracy will be considerably better—limited mostly by the performance of the inertial reference unit.

In a presently preferred embodiment of the invention, the inventive method and apparatus creates a Secure Iridium Broadcast Signal. Although the Iridium signal is technically a TDMA signal, the superposition of several sub-bands together to formulate a high-powered signal to appear more like a secure CDMA signal. With such a formulation, a navigation user knows the code in advance to be able to make use of it. If the pulse patterns that make up the secure Iridium Broadcast Signal are programmed correctly, the high-power signal would appear like the secure Y-code signal of GPS or its equivalent for processing.

The systems architecture for the indoor case driven by multipath imposes an implicit requirement on the total position bias of about 1 meter after 10 minutes of coasting. The limiting inertial parameter is likely to come from the gyrorate bias stability or angle random-walk error. A higher performance inertial system is required if the system is to be used outdoors for high-accuracy and integrity navigation.

The computer 54 serves to tie all the Iridium ranging measurements together especially when there is only a single ranging source in view at any given time. "High accuracy" means position errors at the centimeter level. "High integrity" is a safety related term that means that there is enough redundant information present in the form of excess satellite ranging measurements to determine if there is an error in the positioning system. Such capability can be used to alert an operator of the system when that system should not be used for navigation. High performance navigation employs the carrier phase of the LEO satellite to attain raw range measurements precise to the centimeter level.

Because the system will often be measuring only one ranging source at a time, it is desirable that a precise frequency standard be used. Two types of frequency standards are available for this purpose: an ovenized quartz crystal oscillator and an atomic rubidium frequency standard. An ovenized quartz crystal as long as the Allan variance at 600 seconds (10 minutes) does not exceed $10^{-11}$. This corresponds to about 2 meter of position error over the Iridium pass—significantly less than the multipath error on the Iridium signal. If additional accuracy is needed, a compact, ruggedized rubidium standard should be used. The corresponding Allan variance is $10^{-13}$, corresponding to a position error of about 2 cm over the 10-minute interval.

Raw position solutions from the Iridium receiver 34 through a data bus 50 and acceleration measurements from the inertial measurement unit 36 through a data bus 52 are fed into a computer 54 which executes a Kalman filter to process the measurements into final solutions. The Kalman filter is a set of mathematical equations that provides an efficient computational (recursive) solution of the least-squares method. The filter is very powerful in several aspects: it supports estimations of past, present, and even future states, and it can do so even when the precise nature of the modeled system is unknown.

The Kalman filter estimates a process by using a form of feedback control: the filter estimates the process state at some time and then obtains feedback in the form of (noisy) measurements. As such, the equations for the Kalman filter fall into two groups: time update equations and measurement update equations. The time update equations are responsible for projecting forward (in time) the current state and error covariance estimates to obtain the a priori estimates for the next time step. The measurement update equations are responsible for the feedback—i.e. for incorporating a new measurement into the a priori estimate to obtain an improved a posteriori estimate.

Figure 4:
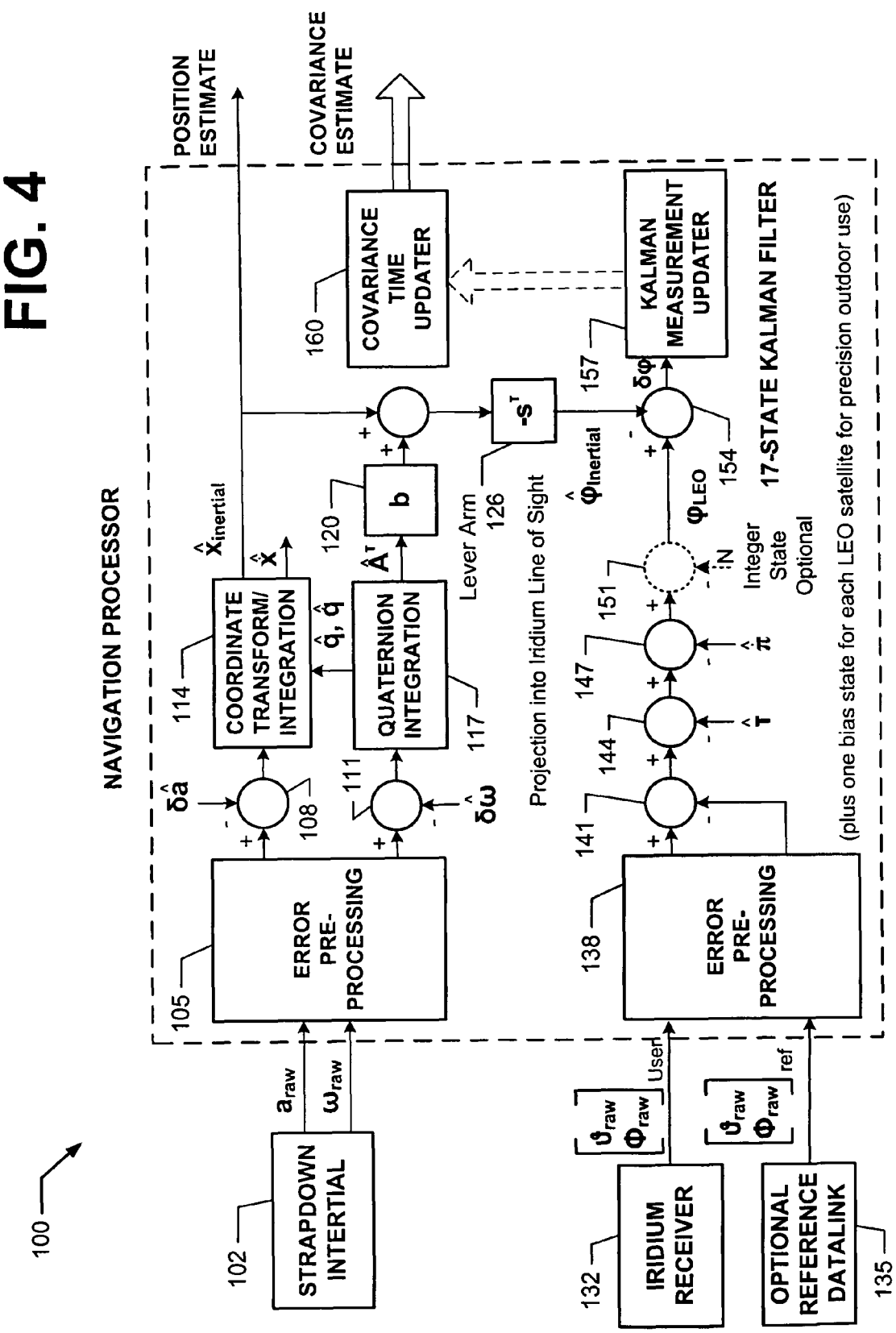
FIG. 4 is a block diagram of a tightly coupled LEO inertial integrator.

Since raw position solutions from the Iridium receiver 34 through a data bus 50 and acceleration measurements from the inertial measurement unit 36 through a data bus 52 that are fed into the computer 54 are measurements of the same phenomenon, i.e. movement in space, the measurements are related in the system modeled by the Kalman filter 157 (FIG. 4).

Depending on the circumstances, not all states (such as yaw attitude) will necessarily be observable at all times. However, because of the orbit geometry of Iridium, the system design ensures that the position component of output will effectively always be observable to within the accuracy of the Iridium ranging measurements.

Figure 3A:
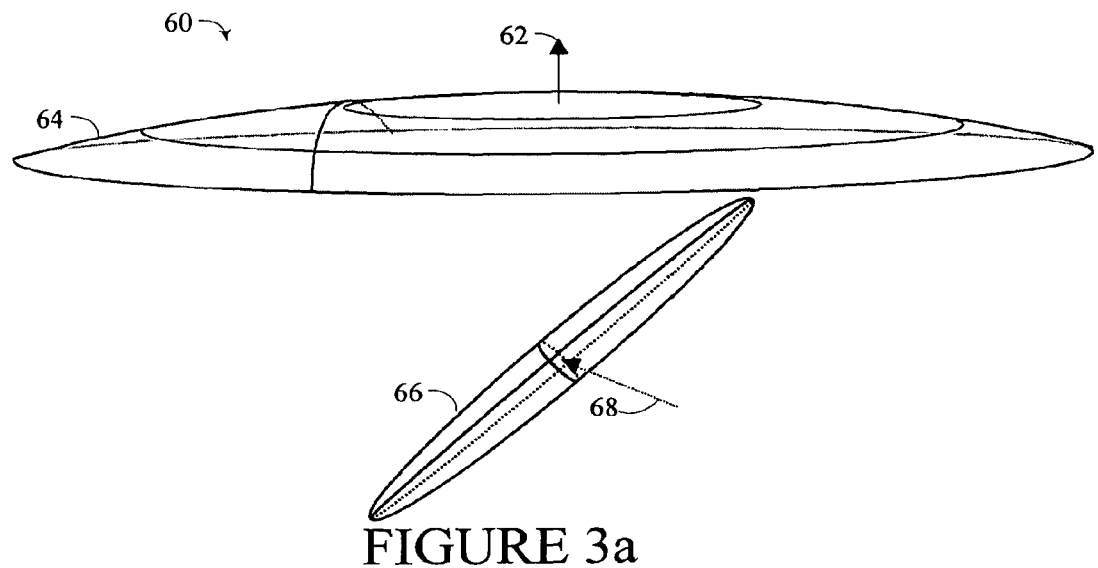
FIG. 3a is a graphic representation of a system covariance from LEO and MEMS sources after a first pass.
Figure 3B:
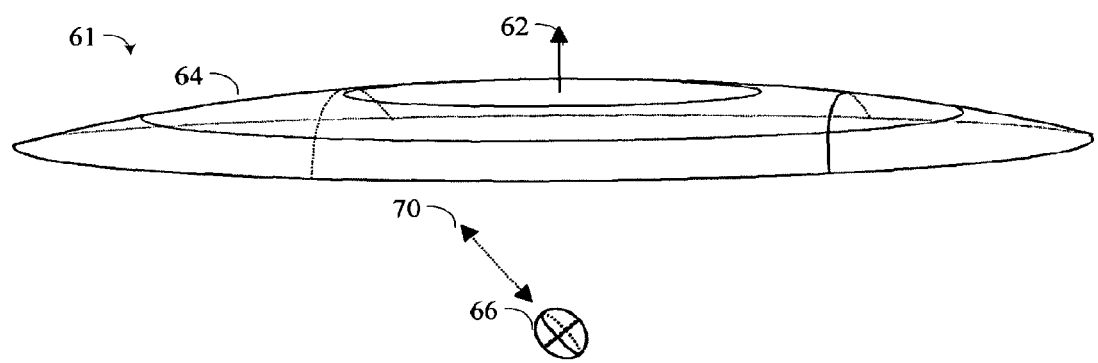
FIG. 3b is a graphic representation of a system covariance from LEO and MEMS sources after subsequent passes.

There are two fundamental modes of operation of this invention. The first is based on code phase measurements. Inside of a building, there are many sources of multipath, so using the carrier is not especially feasible. However, LEO satellites provide an abundance of geometry, as shown in FIG. 3, along with significantly higher broadcast power that is useful for penetrating physical barriers. The code ranging measurements can be combined using this geometry to solve for reasonably accurate position; using the inertial navigation unit to bridge measurements made at different times.

The second mode of operation is based on carrier phase measurements. If carrier phase measurements are made outdoors, it is possible to obtain a clean line of sight to the LEO satellites, and therefore, achieve centimeter-level positioning accuracy. The same abundance of geometry, as shown in FIG. 3, enables these precision measurements to be combined into high accuracy and high integrity position solutions, again using the inertial navigation unit to bridge measurements made at different times.

FIG. 3 shows a typical geometry pass from the standpoint of the user. The Iridium satellites fly in an arc over an interval of several minutes. Multipath will generally be the largest error source. The Iridium carrier phase can be used to drive the ranging error to be arbitrarily small—potentially to centimeter level—when the user has a clear view of the sky. Unfortunately, raw ranging errors will tend to increase to roughly 20-30 m working indoors. Because the Iridium satellite spans a large-angle arc in the sky, it should be possible to take advantage of spatial diversity to average down much of this indoor multipath error. By analogy with experimental GPS performance, it is possible to predict what Iridium performance is likely to be by scaling the parameters. The correlation time between Iridium measurements is estimated to be about 10 seconds, meaning that over a 10-minute pass, the receiver can gather roughly 60 "independent" measurements. Therefore, the ranging accuracy may perhaps be improved to roughly 4 meters (dividing the raw ranging accuracy by the square root of 60).

As shown in FIG. 3, a cold start initialization 60 uses a trajectory of the first Iridium satellite pass to define a local section of the Iridium orbit sphere 64 having a zenith 62 relative to the position of the user 68. Inertial navigation by the inertial measurement unit 36 yields a positional covariance after the first pass 66 as shown relative the position of the user 68. The rapidly changing angle of the orbit of the LEO satellite in the LEO satellite orbit sphere 64 allows for a rapid convergence of the position estimate allowable by means of the LEO satellite in its orbit sphere 64.

The system structure resembles a tightly coupled GPS-Inertial unit. However, as shown in FIG. 4, the system 100 is intended to process as few as a single range measurement at a time using a Kalman filter 150. For dynamic applications, a MEMS Inertial Reference Unit (IRU) 102 is coupled to the system and subjected to error preprocessing in the error preprocessing unit 105. In more demanding applications, an inertial-grade IRU may be desirable.

A general model for a suitable IRU 102 includes a strapdown inertial navigation system. Strapdown inertial navigation systems are rigidly fixed to the moving body. Therefore, strapdown inertial reference units move with the body, their gyros experiencing and measuring the same changes in angular rate as the body in motion. The strapdown inertial reference unit contains accelerometers to measure changes in linear rate in terms of the body's fixed axes. The body's fixed axes serve as a moving frame of reference as opposed to the constant inertial frame of reference. The navigation computer uses the gyros' angular information and the accelerometers' linear information to calculate the body's 3D motion with respect to an inertial frame of reference.

The IRU 102 senses inertial acceleration which it outputs as rotational acceleration. The rotational acceleration vector information is fed into an error preprocessor 105. The inertial error preprocessor 105 corrects pre-calibrated parameters, including scale factor and alignment errors. Next, the corrected measurements pass through the time update blocks 108 and 111, including the addition of the accelerometer and gyro bias states and the integration of the strapdown IRU 102 measurements into position, velocity, and attitude vectors.

At an in-phase coordinate processor 114 and a quatrature coordinate processor 117, a vector translation, $x_j$, and attitude motion, represented by the 3×3 attitude rotation matrix A, of the user platform. With prior knowledge of the antenna mounting lever arm b 120, with respect to the body frame of the user platform, it is possible to use the inertial signal output from the in-phase coordinate processor 114 and the quatrature coordinate processor 117 to project the antenna motion into the line of sight of the satellite, $\hat{s}$ at a processor 126. The output of the processor 126 is a complex, real-time phase correction. The phase correction is to subtract out short-term user motion and enable long integration times on a LEO signal, when such a LEO signal is available.

On the LEO receiver side of a LEO (in the case of the presently preferred embodiment, an IRIDIUM) receiver 132 receives a carrier signal from the LEO satellite. In an presently preferred embodiment, a second carrier signal received at a reference ground-station in proximity to the user device is also received in association with the precise position of the ground-station position at an optional datalink 135. The second carrier signal insures a rapid integration of the carrier signal from the LEO satellite and further enables operation of an LEO error preprocessor 138.

As with the inertial side, the LEO error preprocessor 138 corrects pre-calibrated parameters, including scale factor and alignment errors. Additionally, the LEO error preprocessor 138 corrects propagation induces errors based upon the information received at the optional datalink 135. The error processor 138 applies corrections such as for atmospheric/ionospheric effects, time tag alignments, and blending code and carrier.

Bias state time update blocks 141, 144, 147, and 151 apply the scalar receiver clock and clock bias estimates to the raw measurements. A further bias block 154, uses the output of the processor 126 to subtract out short-term user motion and enable long integration times on a LEO signal, when such a LEO signal is available. The corrected LEO position is ready for feeding into the Kalman filter 157. In the presently preferred embodiment the computer 54 executes a 17-state Kalman filter estimator to solve for:

Position (3 axes)
Velocity (3 axes)
Accelerometer bias (3 axes)
Attitude (3 axes)
Gyro bias (3 axes)
Clock bias
Clock drift A covariance time updater 160 propagates a state covariance estimate. The estimated inertial position, projected into the line of sight of each given LEO satellite by the processor 126, is compared with the measured range to the LEO satellite to form the measurement update to the Kalman filter 157.

Figure 5:
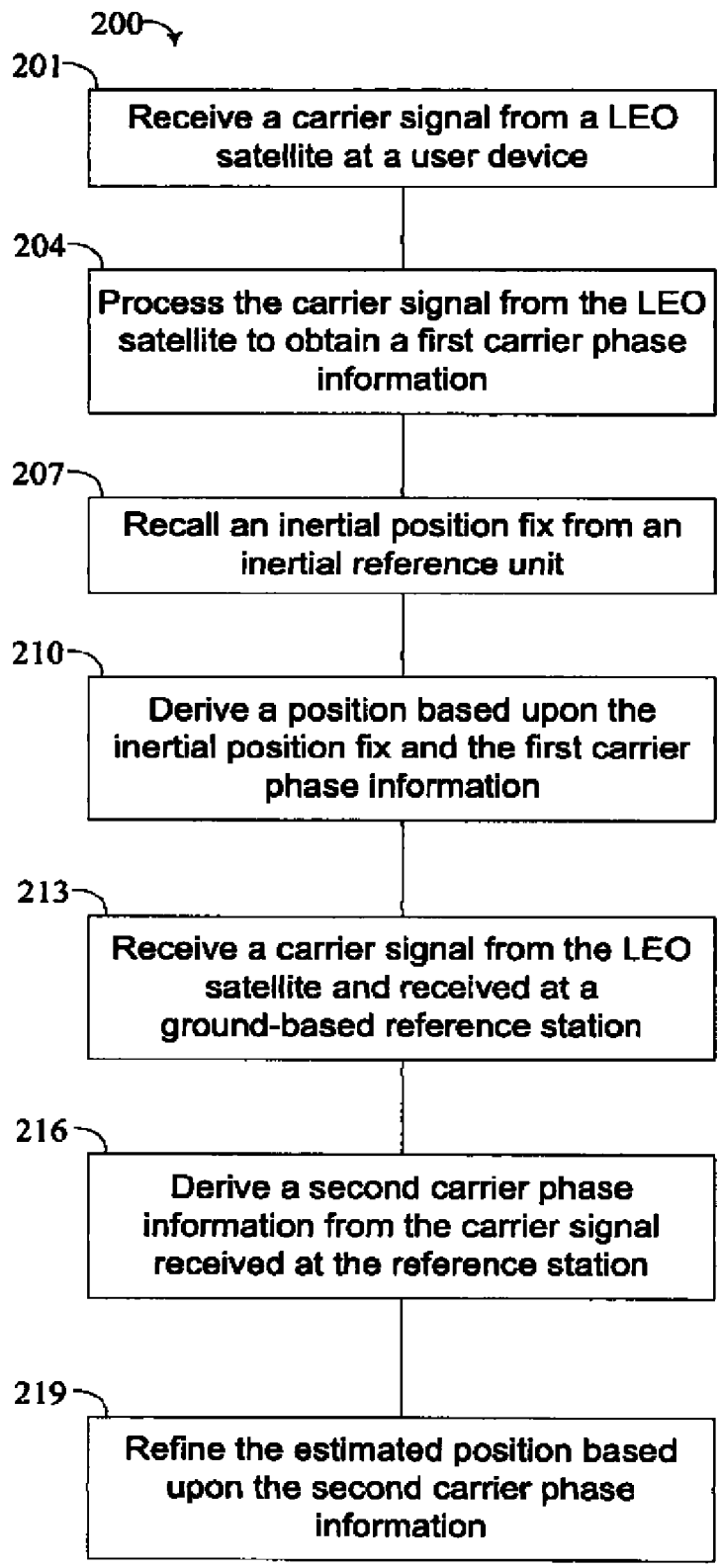
FIG. 5 is a flowchart to describe a process for deriving a position based upon a LEO signal and an inertial position fix.

Referring to FIG. 5, a method 200 is provided for estimating a precise position of a user device in a satellite-based navigation system. At a block 201, a user device receives transmitted carrier signals from a set of LEO satellites. At a block 204, the user device processed the carrier signals to obtain user carrier phase information including geometrically diverse user carrier phase information from the set of LEO satellites. At a block 207, the user device recalls an inertial position fix. At a block 210, the precise position of the user device based on the inertial position fix and the user carrier phase information. At a block 213, the user device derives user carrier information from the set of LEO satellites based upon the inertial position to resolve integer cycle ambiguities in the user carrier phase information.

In a preferred embodiment, the method 200 includes tracking the carrier signals at a reference station to, obtain reference carrier phase information. The reference carrier phase information includes geometrically diverse reference carrier phase information from the set of LEO satellites. At a block 216, the user device refines the accuracy of the position calculation based upon the reference carrier phase information. In a preferred embodiment, the method further comprises estimating an approximate user position and clock offset using code phase signals received from a set of navigational satellites.

Preferably, differential code phase techniques are used to improve the accuracy of the initial estimate. The preferred embodiment of the method also includes additional advantageous techniques such as: compensating for frequency dependent phase delay differences between carrier signals in user and reference receiver circuits, reading navigation carrier information and LEO carrier information within a predetermined time interval selected in dependence upon an expected motion of the user receiver and the LEO signal sources, calibrating LEO oscillator instabilities using navigation satellite information, compensating for phase disturbances resulting from a bent pipe LEO communication architecture, compensating for oscillator instabilities in the user and reference receivers, predicting present reference carrier phase information based on past reference carrier phase information, and monitoring the integrity of the position calculation.

Depending on the circumstances, not all states (such as yaw attitude) will necessarily be observable at all times. Because of the orbit geometry of Iridium—specifically the rapid large-angle overhead motion—the system ensures that, upon convergence, the position component of output will effectively always be observable to within the accuracy of the Iridium ranging measurements.

If high-performance carrier ranging is to be carried out, an optional float bias state is added, one for each LEO satellite, as shown in FIG. 4, to account for the integer cycle ambiguity. Accordingly, the scope of the invention is not limited by the disclosure of the preferred embodiment. Instead, the invention should be determined entirely by reference to the claims that follow.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A user device for estimating a precise position from signals from a low earth orbit (LEO) satellite, the user device comprising:

a receiver configured to receive at least one carrier signal at the user device, each carrier signal being transmitted by a distinct LEO satellite;

a signal processor configured for processing the carrier signals to obtain carrier or code phase information;

a position sensor for recalling an inertial position fix of the user device; and a processor for using the position fix with the carrier or code phase information to determine a precise position of the user device, wherein the positional fix is used to reduce integration time on the LEO signals to allow the LEO signals to be used in at least one of deep indoors and conditions of high jamming.

2. The user device of claim 1, wherein the processor is further configured to resolve integer cycle ambiguities based upon the inertial position.

3. The user device of claim 1, wherein the receiver is further configured to process the carrier signals received at a reference station to obtain a second reference carrier phase information.

4. The user device of claim 3, wherein the processor is further configured to refine the position of the user device based upon the second reference carrier phase information.

5. The user device of claim 1, wherein the processor is further configured for estimating an approximate user position and clock offset using code phase signals received from a set of navigational satellites.

6. The user device of claim 1, wherein the position sensor includes an inertial reference unit.

7. The user device of claim 6, wherein the inertial reference unit includes MEMS inertial sensors.

8. A computer software product comprising a non-transitory computer readable medium encoded with data for causing a user device to estimate a precise position of the user device, the estimating including:

processing carrier signals received by the user device from at least one low earth orbit (LEO) satellite to obtain carrier or code phase information;

recalling an inertial position fix of the user device; and deriving a precise position of the user device based on the inertial position fix and the carrier or code phase information, wherein the inertial position fix is used to reduce integration time on the LEO signals to allow the LEO signals to be used in at least one of deep indoors and conditions of high jamming.

9. The software product of claim 8, wherein carrier phase information is refined to resolve integer cycle ambiguities.

10. The software product of claim 8, wherein the carrier signals received at a reference station are processed to obtain a second reference carrier phase information.

11. The software product of claim 8, wherein the position of the user device is refined using the code phase information.

12. A method comprising estimating a precise position of a user device, including:

deriving a positional fix from an inertial measurement unit carried by the user device;

obtaining carrier or code phase information from signals from a low earth orbit (LEO) satellite; and using the positional fix with the carrier or code phase information to determine the precise position of the user device, wherein the positional fix is used to reduce integration time on the LEO signals to allow the LEO signals to be used in at least one of deep indoors and conditions of high jamming.

13. The method of claim 12, wherein the positional fix is used to refine carrier phase information to resolve integer cycle ambiguities.

14. The method of claim 12, wherein the positional fix is used to refine code phase information.

15. The method of claim 12, wherein the inertial measurement unit includes MEMS inertial sensors for deriving the positional fix.

16. A method comprising estimating a precise position of a user device, including:
   deriving a positional fix from an inertial measurement unit carried by the user device;
   obtaining carrier or code phase information from signals from a low earth orbit (LEO) satellite; and
   using the positional fix with the carrier or code phase information to determine the precise position of the user device, including using a Kalman filter to provide time updates to obtain a priori estimates for a next position of the user device, and measurement updates to obtain an improved a posteriori estimate of the user device position.

17. The method of claim 16, wherein the positional fix is used to refine carrier phase information to resolve integer cycle ambiguities.

18. The method of claim 16, wherein the positional fix is used to refine code phase information.

19. A user device, including:
   an inertial measurement unit;
   means for deriving a positional fix from the inertial measurement unit;
   means for obtaining carrier or code phase information from signals from a low earth orbit (LEO) satellite; and
   means for using the positional fix with the carrier or code phase information to determine precise position of the user device, including a Kalman filter to provide time updates to obtain a priori estimates for a next position of the user device, and measurement updates to obtain an improved a posteriori estimate of the user device position.

20. A computer software product comprising a non-transitory computer readable medium encoded with data for causing a user device to estimate a precise position of the user device, the estimating including:
   deriving a positional fix from an inertial measurement unit carried by the user device;
   obtaining carrier or code phase information from signals from a low earth orbit (LEO) satellite; and
   using the positional fix with the carrier or code phase information to determine the precise position of the user device, including using a Kalman filter to provide time updates to obtain a priori estimates for a next position of the user device, and measurement updates to obtain an improved a posteriori estimate of the user device position.

* * * * *